(12) United States Patent
Gous et al.

(10) Patent No.: US 7,958,209 B2
(45) Date of Patent: Jun. 7, 2011

(54) METHODS AND SYSTEMS TO GENERATE AND IMPLEMENT A CHANGEOVER SEQUENCE TO RECONFIGURE A CONNECTION-ORIENTED NETWORK

(75) Inventors: Alan Gous, Palo Alto, CA (US); Arman Maghbouleh, Mountain view, CA (US); Arash Afrakhteh, Melno Park, CA (US); Andre Hentz, Mountain View, CA (US)

(73) Assignee: Cariden Technologies, Inc., Mountain View, CA (US)

( * ) Notice: Subject to any disclaimer, the term of this patent is extended or adjusted under 35 U.S.C. 154(b) by 320 days.

(21) Appl. No.: 11/927,956

(22) Filed: Oct. 30, 2007

(65) Prior Publication Data
US 2008/0056127 A1    Mar. 6, 2008

(51) Int. Cl.
*G06F 15/177* (2006.01)
(52) U.S. Cl. ........................................... 709/221
(58) Field of Classification Search .................. None
See application file for complete search history.

(56) References Cited

U.S. PATENT DOCUMENTS

| | | | |
|---|---|---|---|
| 5,088,032 A | 2/1992 | Bosack | |
| 5,467,348 A | 11/1995 | Fujii et al. | |
| 5,533,009 A | 7/1996 | Chen | |
| 5,745,694 A | 4/1998 | Egawa et al. | |
| 5,838,663 A | 11/1998 | Elwalid et al. | |
| 5,892,451 A | 4/1999 | May et al. | |
| 5,970,064 A | 10/1999 | Clark et al. | |
| 5,987,521 A | 11/1999 | Arrowood et al. | |
| 6,003,062 A | 12/1999 | Greenberg et al. | |
| 6,003,075 A * | 12/1999 | Arendt et al. | 709/221 |
| 6,028,840 A | 2/2000 | Worster | |
| 6,052,750 A | 4/2000 | Lea | |
| 6,097,722 A | 8/2000 | Graham et al. | |
| 6,130,881 A | 10/2000 | Stiller et al. | |
| 6,442,138 B1 * | 8/2002 | Yin et al. | 370/232 |
| 6,621,798 B1 * | 9/2003 | Krishnan et al. | 370/256 |
| 6,795,399 B1 | 9/2004 | Benmohamed et al. | |
| 2002/0194362 A1 | 12/2002 | Rawlins et al. | |

OTHER PUBLICATIONS

"U.S. Appl. No. 10/170,848, Non Final Office Action mailed Dec. 19, 2005", 18 pgs.
"U.S. Appl. No. 10/170,848, Non Final Office Action mailed Dec. 27, 2006", 9 pgs.
"U.S. Appl. No. 10/170,848, Final Office Action mailed Jun. 20, 2006", 16 pgs.
"U.S. Appl. No. 10/170,848, Response filed Mar. 13, 2006 to Non Final Office Action mailed Mar. 13, 2006", 22 pgs.
"U.S. Appl. No. 10/170,848, Response filed Jun. 27, 2007 to Non Final Office Action mailed Jun. 27, 2007", 18 pgs.
"U.S. Appl. No. 10/170,848, Response filed Sep. 20, 2006 to Final Office Action mailed Jun. 20, 2006", 16 pgs.

* cited by examiner

*Primary Examiner* — Thu Nguyen
*Assistant Examiner* — Julian Chang
(74) *Attorney, Agent, or Firm* — Schwegman, Lundberg & woessner, P.A.

(57) ABSTRACT

A method to reconfigure a connection-oriented network from an existing configuration to a desired configuration includes generating a sequence of configuration specifications for the connection-oriented network. The sequence specifies a plurality of intermediate configurations between the existing and the desired configurations. The sequence of configuration specifications is implemented within the connection-oriented network by, for each configuration specification, issuing at least one instruction to an element of the connection-oriented network to modify configuration information maintained at the element to thereby instantiate respective configurations. The implementing includes issuing a specific instruction to instantiate a subsequent configuration specification only if an acknowledgment is received that a preceding configuration has been successfully instantiated.

16 Claims, 8 Drawing Sheets

ROUTING/ADMISSION DATA STRUCTURE 36

| SOURCE NODE 40 | CONNECTION ID 42 | MAXIMUM ADMISSION LEVEL 46 | ROUTE 44 |
|---|---|---|---|
| 1 | 1 | 5 | NODE 1 -> LINK 1 -> NODE 2 |
| 1 | 2 | 10 | NODE 1 -> LINK 2 -> NODE 3 -> LINK 3 -> NODE 2 |

FIG. 3

BANDWIDTH ALLOCATION MATRIX 54

| CONNECTION ID | LINK 1 | LINK 2 | LINK 3 | NODE 1 | NODE 2 | NODE 3 |
|---|---|---|---|---|---|---|
| 1 | 5 | 0 | 0 | 5 | 5 | 0 |
| 2 | 0 | 10 | 10 | 10 | 10 | 10 |
| TOTAL BANDWIDTH ALLOCATED | 5 | 10 | 10 | 15 | 15 | 10 |

FIG. 4

| NETWORK ELEMENT CAPACITY TABLE | | |
|---|---|---|
| NETWORK ELEMENT | OPERATIONAL BANDWIDTH CAPACITY (MB/S) | RESERVED BANDWIDTH CAPACITY (MB/S) |
| LINK 1 | 20 | 5 |
| LINK 2 | 20 | 5 |
| LINK 3 | 20 | 5 |
| NODE 1 | 100 | 20 |
| NODE 2 | 100 | 20 |
| NODE 3 | 100 | 20 |

METHODS AND SYSTEMS TO GENERATE AND IMPLEMENT A CHANGEOVER SEQUENCE TO RECONFIGURE A CONNECTION-ORIENTED NETWORK

CLAIM OF PRIORITY

This application claims the benefit of the filing date of the U.S. application Ser. No. 10/170,848 filed Jun. 11, 2002, entitled "METHODS AND SYSTEMS TO GENERATE AND IMPLEMENT A CHANGEOVER SEQUENCE TO RECONFIGURE A CONNECTION-ORIENTED NETWORK," and to Provisional Application Ser. No. 60/298,489, filed Jun. 14, 2001 and entitled "A METHOD AND SYSTEM FOR NETWORK CONTROL." The entire content of each of the above applications is incorporated herein by reference.

FIELD OF THE INVENTION

The present invention relates generally to the field of data networking and, more specifically, to methods and systems for configuring a network.

BACKGROUND OF THE INVENTION

Connection-oriented data networks transmit data from point to point within the network along connections. These connections may be established along fixed paths or routes from a source node to a destination node within the network. The connections may be set up physically, for example in optically routed networks, or virtually, for example in Asynchronous Transfer Mode (ATM) networks or Multi Protocol Label Switching (MPLS) networks. Virtual connection-oriented networks are also termed permanent virtual circuit (PVC) networks.

Besides a routing that is specified for each connection, a connection might be controlled by a specified bandwidth admission level. If an admission level is set for a connection, then the source node of the connection will not allow data entering the network along that connection to exceed the bandwidth specified by the admission level. Specification of admission levels may help to reduce congestion in the network that would otherwise result from more data being admitted into the network than can be handled within the bandwidth capacity of the network elements.

Routes and admission levels for connections may be chosen through a number of mechanisms or algorithms, and may be allocated as the network receives requests to set up connections. Connections may be set up to handle a certain amount of bandwidth determined either through a statistical estimation of the demand for that connection, or through an explicit request for a given bandwidth through a Service Level Agreement (SLA).

The routings for connections (e.g., physical or virtual) in a connection-oriented network typically remain unchanged for a time after they are set up. However, at some time after they are set up, there may be a need to change the routings and/or admission levels for some or all connections in the network. This may be, for example, because some more optimal routing and admission configuration has been discovered, and because Service Level Agreements (SLAs) have changed, because estimated bandwidth demands have changed, or because some components of the network need to be replaced. To perform the change of routings and/or admission levels, a planned outage may be required, and routings changed to avoid the network elements to be taken down.

To provide high quality-of-service (QoS) on a data network (e.g., for voice transmissions or financial data transmissions), it is desirable that data connections in a network do not break or become congested, even for short periods of time. Currently, even if it is the case that all connections under a current routing and admission configuration and under a desired routing and admission configuration are able to provide the desired bandwidths, guarantees of avoidance of connection congestion or breakdown are difficult during a changeover from the current to the desired configuration. This is because routing and admission changes are typically performed in a distributed fashion by the source nodes of the connections using the relevant routings and admissions. Because these source nodes are distributed throughout the network, it is not a simple matter to synchronize the changes so that they all take place simultaneously. Therefore, there is a possibility that the network will exist, at least for a time, in intermediate configurations in which the routings and admissions are not correctly coordinated, leaving some connections broken or with insufficient bandwidth.

SUMMARY OF THE INVENTION

Other features of the present invention will be apparent from the accompanying drawings and from the detailed description that follows.

According to the first aspect of the present invention, there is provided method to generate a changeover sequence to reconfigure connections of a connection-oriented network from an existing configuration to a desired configuration. The method includes examining the existing configuration and the desired configuration for the connections of the connection-oriented network. A sequence of configuration specifications for the connection-oriented network is generated so that the last configuration specification of the sequence specifies the desired configuration. Subsequent to the generation of each configuration specification in the sequence, a determination is made if a total of bandwidth admission levels for an element exceeds a maximum bandwidth capacity for the element and, if so, the generation of the changeover sequence is aborted.

According to a second aspect of the present invention, there is provided a method to reconfigure a connection-oriented network from an existing configuration to a desired configuration. A sequence of configuration specifications for the connection-oriented network is generated, the sequence specifying a plurality of intermediate configurations between the existing and the desired configurations. The sequence of configuration specifications is implemented within the connection-oriented network by, for each configuration specification, issuing at least one instruction to an element of the connection-oriented network to modify configuration information maintained at the element to thereby instantiate respective configurations. The implementing includes issuing a specific instruction to instantiate a subsequent configuration specification only if an acknowledgment is received that a preceding configuration has been successfully instantiated.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Methods and systems for implementing and generating a changeover sequence to reconfigure a connection-oriented network are described. In the following description, for purposes of explanation, numerous specific details are set forth in order to provide a thorough understanding of the present invention. It will be evident, however, to one skilled in the art that the present invention may be practiced without these specific details.

The description of an exemplary embodiment of the present invention that follows describes two exemplary aspects of the present invention, namely the generation of a changeover sequence for reconfiguring a connection-oriented network, and the implementation (or execution) of the changeover sequence to reconfigure the connection-oriented network. In the exemplary embodiments, the changeover sequence comprises a sequence of routing/admission data structures that each specify routing and bandwidth admission level parameters. When implemented (or instantiated) sequentially, the sequence reconfigures the connection-oriented network to migrate from an existing configuration to a desired configuration. In the exemplary embodiment, the changeover sequence is devised and generated by a central controller, in the exemplary form of a routing/admission changeover system. The central controller may be a computer system attached to the connection-oriented network in such a way as to enable the central controller to glean knowledge regarding the topology of the network (e.g., utilizing a Management Information Based (MIB) and remote monitoring (RMON)). The central controller, in the exemplary embodiment, is also coupled to the network so as to enable the issuance of instructions from the central controller to nodes of the network to change routing and admission configurations.

During the implementation (or execution) of the changeover sequence, the central controller steps through the changeover sequence. Specifically, the central controller may issue instructions to the nodes of the connection-oriented network for which routing and/or admission level changes are required in order to proceed from one network configuration to a next, possibly intermediate, configuration as defined by a next configuration specification within the changeover sequence of configuration specifications. The exemplary central controller does not issue instructions to the nodes of the network to instantiate the configuration specified by the next configuration specification until it has received acknowledgement from the nodes to which instructions were issued in order to instantiate a current configuration, specified by current configuration specification.

Each network configuration, specified by each configuration specification of the changeover sequence, seeks to provide a stable route and admission configuration and an acceptable level of bandwidth for each connection. An exemplary embodiment of the present invention also contemplates that, if multiple nodes of the network are each sent a changeover instruction from the central controller during the course of configuring the network according to a configuration specification, the multiple nodes may implement these instruction in any order without a reduction in the bandwidth of a connection below a predetermined acceptable bandwidth level.

By having the central controller wait for acknowledgement of successful completion of the implementation of a configuration specification before instructing implementation of a subsequent configuration specification of the changeover a sequence, the present invention attempts, inter alia, to address a synchronization problem that would otherwise arise as a result of nodes receiving and executing instruction in an unintended order.

According to a further aspect of the present invention, a certain amount of reserved or "swap" bandwidth is set aside for each network element (e.g., node and connection) of the connection-oriented network in order to increase the probability that the central controller will successfully be able to generate a changeover sequence. It is not necessarily guaranteed, given existing and desired configurations on a particular connection-oriented network, that a workable changeover sequence exists. The reserved bandwidth on each network element serves to increase the probability that the central controller can successfully generate a changeover sequence. In one embodiment, the reserved bandwidth of each network element may not be used in either an existing or a desired configuration (e.g., operational configurations) and may only be utilized (or allocated) for intermediate configurations that are specified by the changeover sequence as part of the migration process from the existing to the desired configuration. It will also be appreciated that increasing the quantity of reserved bandwidth for the network elements will increase the probability that the central controller will be able to generate a workable changeover sequence.

In one exemplary embodiment of the present invention, the changeover sequence may be generated so that a first intermediate configuration, as specified by a first intermediate configuration specification of the changeover sequence, requires no routing changes within the network, and requires only that a bandwidth admission level for each connection be reduced to the lower of a bandwidth admission level specified by the existing configuration or a bandwidth admission level specified by the desired configuration. Subsequent intermediate configuration specifications of the changeover sequence may each require the changing of the routing of at least one connection. The order in which the routing changes are made is determined by a search (or calculation) algorithm, an exemplary embodiment of which is described in further detail below. The exemplary search algorithm searches for an order that ensures that the bandwidth demand placed on each network element is not exceeded by the bandwidth capacity of the respective network element at each of the intermediate and operational configuration. In the exemplary embodiment, the final step of the changeover sequence optionally raises all bandwidth admission levels for all connections to a level specified by the desired configuration. The changeover sequence is then complete.

Figure 1:
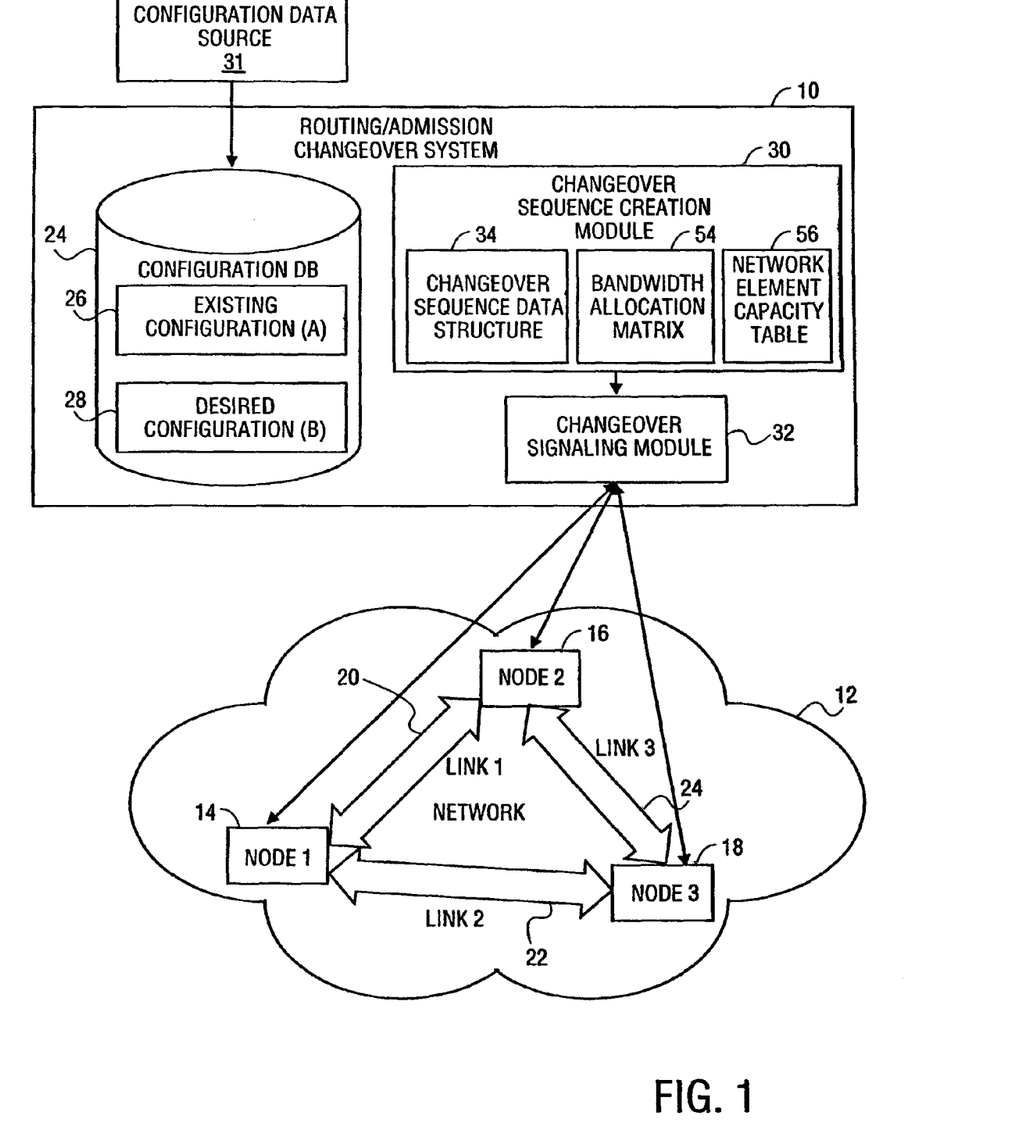
FIG. 1 is a block diagram illustrating the architecture of an exemplary changeover system that operates to generate and implement a changeover sequence to reconfigure a connection-oriented network from an existing configuration to a desired configuration.

FIG. 1 is a block diagram illustrating the architecture of a changeover system 10, according to an exemplary embodiment of the present invention, that operates to generate and implement a changeover sequence to reconfigure a connection-oriented network from an existing configuration to a desired configuration. In this exemplary embodiment of the present invention discussed below, the configuration of a network shall, for the purposes of illustration, be discussed as being a routing and admission configuration. The invention may, however, be applied to configure other parameters and characteristics of a network. Furthermore, the exemplary embodiment of the present invention is discussed periodically below within the context of a connection-oriented network that utilizes Multi Protocol Label Switching (MPLS) protocol to establish connections. Again, the present invention is not limited to this mechanism, and may find application in any data or communications network that is connection-oriented (e.g., Asynchronous Transfer Mode (ATM) networks, X.25 networks or networks utilizing the Transmission Control Protocol (TCP)). It should also be recognized that the term "connection-oriented network" shall be deemed to include connectionless networks (e.g., IP network) within or on which connection-oriented functionality is provided, for example, by a higher-level protocol such as the MPLS framework or other framework within the Connection Oriented Link Layer (COLL).

Referring now specifically to FIG. 1, the exemplary changeover system 10 is shown to be coupled to a connection-oriented network 12 that, for the purposes of illustration, is shown to include three nodes 14, 16 and 18 coupled by respective links 20, 22 and 24. Each node maintains a routing table (e.g., a MPLS routing table) or a forwarding table, that specifies how a network traffic received at the node should be directed. The collection of routing tables within the network 12 effectively serves to define connections within the network 12, and also to specify a bandwidth admission level for each of these defined connections. For example, a first connection between the node 14 and node 16 may include node 14, link 20 and node 16. A second 6 may include node 14, link 22, node 18, link 24 and node 16.

The changeover system 10 is shown to be in communication with the nodes of the network 12 so as to enable the changeover system 10 to issue instructions to the respective nodes in order to modify routing and/or bandwidth admission level information stored at each of the nodes.

The changeover system 10 is also shown to include a configuration database 24 that stores an existing network configuration 26 and a desired configuration 28. The configurations 26 and 28 stored within the configuration database 24 may be received from one or more external configuration data sources 31. A configuration data source 31 may interrogate the network 12 in order to determine the existing configuration 26, or a network operator may supply this information. A configuration data source 31 of the desired configuration 28 may be a network operator, or an automated routing optimization scheme, for example.

A changeover sequence creation module 30 is shown to be coupled to, and receive the existing configuration 26 and the desired configuration 28 from, the configuration database 24. The changeover sequence creation module 30 operates to generate a changeover sequence of configuration specifications (e.g., routing and bandwidth admission level configuration specifications) to migrate the network 12 from an existing configuration to a desired configuration. In one embodiment, the changeover sequence includes a sequence of intermediate configuration specifications, and ends with a configuration specification that conforms the network 12 to the desired configuration 28.

Having generated the changeover sequence, the changeover sequence creation module 30 communicates the changeover sequence to a changeover signaling module 32. The changeover signaling module 32 operates to convert the changeover sequence into a list of instructions that are communicated to sets of nodes of the network 12. Specifically, for each configuration specification within the changeover sequence, a respective instruction (or sets of instructions) may be sent to an appropriate node (or set of nodes) that are to be reconfigured in accordance with relevant configuration specification. The changeover signaling module 32 also receives acknowledgments from the nodes of the network 12 that the relevant nodes have successfully executed the received instructions.

Figure 2:
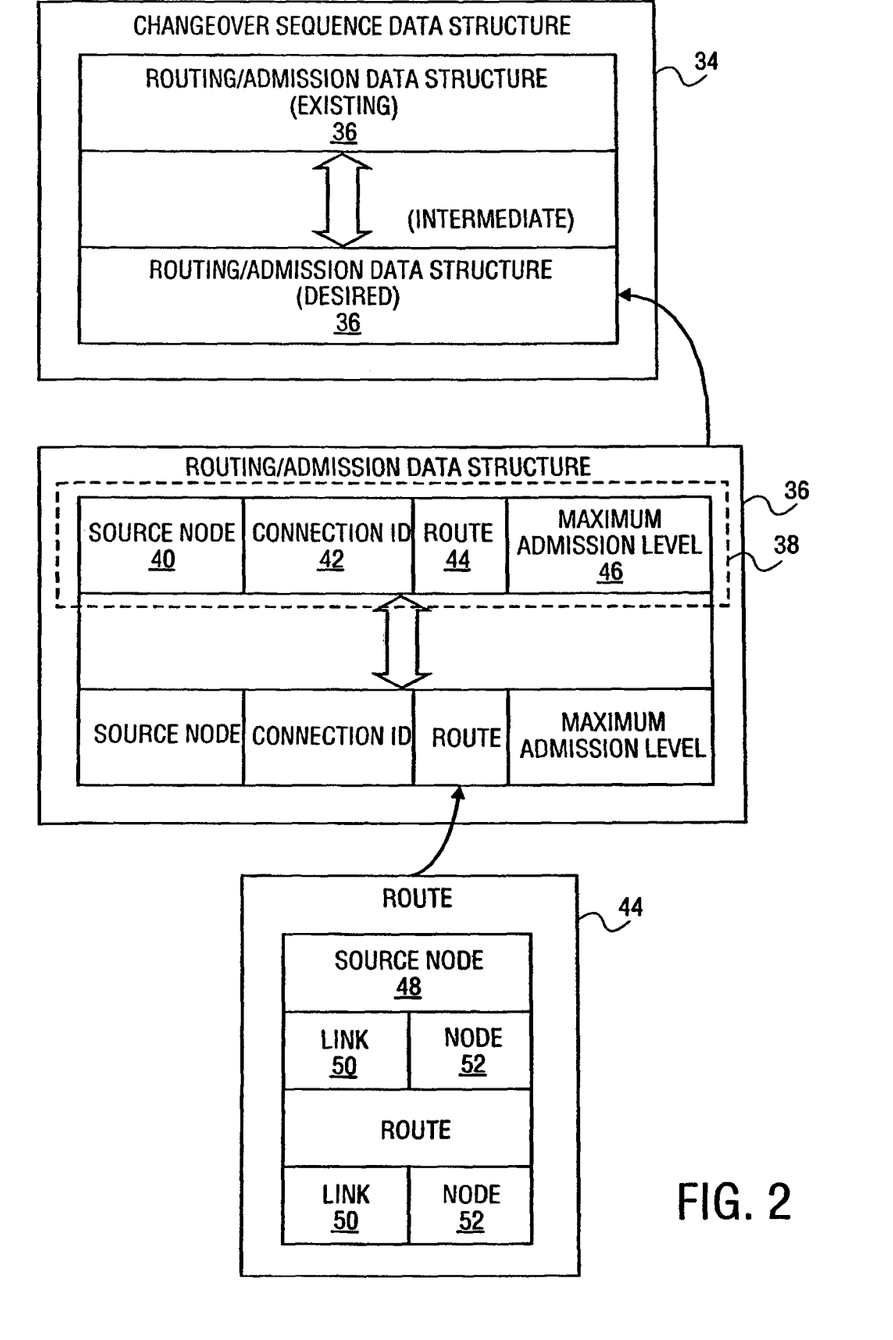
FIG. 2 is a block diagram providing a view of a changeover sequence data structure, according to an exemplary embodiment of the present invention, that may be generated by the changeover sequence creation module.

FIG. 2 is a block diagram providing a view of a changeover sequence data structure 34, according to an exemplary embodiment of the present invention, which may be generated by the changeover sequence creation module 30. In the exemplary embodiment, the changeover sequence data structure 34 is composed of a sequence of configuration specifications in the form of routing/admission data structures 36. A first of the routing/admission data structures 36 describes the existing configuration 26, while a last of the routing/admission data structures describes the desired configuration 28. Intermediate routing/admission data structures 36 describe intermediate configurations for the connection-oriented network 12 so as to migrate the network 12 from the existing configuration 26 to the desired configuration 28.

Each routing/admission data structure 36 is itself shown to include a sequence of records 38, each record 38 describing a respective connection to be configured within the network 12.

Each record 38 within the routing/admission data structure 36 is further shown to include a source node 40, a connection identifier 42, a route 44 and a maximum bandwidth admission level 46. The source node 40 within a record 38 associated with a particular connection is the first node of the connection across the network 12 and, in many connection-oriented networks, is the node responsible for initiating a signaling to modify a routing and/or bandwidth admission level for the relevant connection. The connection identifier 42 is an identifier uniquely identifying the relevant connection. The maximum bandwidth admission level 46 is the maximum amount of bandwidth (e.g., expressed in Mbits/second) that the source node will allow onto the relevant connection.

The route 44 may itself consist of a number of fields and, as illustrated in FIG. 2, includes a source node 48 (corresponding to the source node 40 of the record 38) together with a list of links 50 and a corresponding list of nodes 52. The route defined by the route 44 begins with the indicated source node 48, followed by the list of links 50, ending with a last destination node 52.

Figure 3:
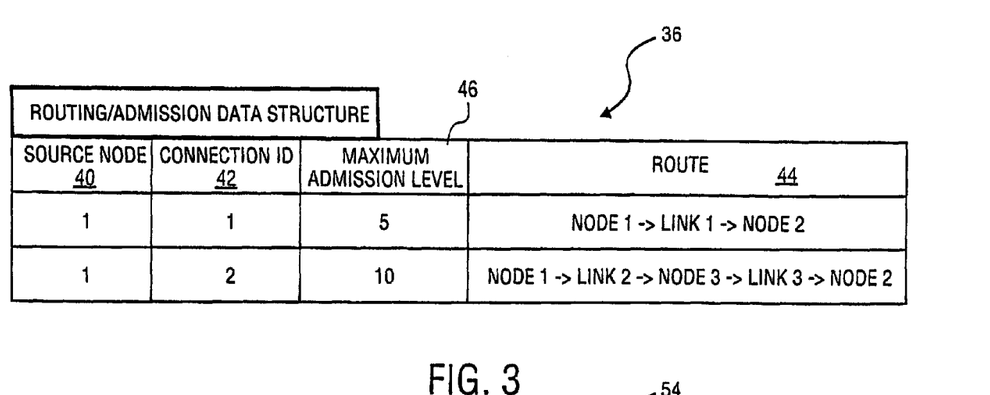
FIG. 3 is a table showing a portion of an exemplary and illustrative routing/admission data structure that includes records defining two exemplary connections within the connection-oriented network.

FIG. 3 is a table showing a portion of an exemplary and illustrative routing/admission data structure 36 that includes records defining two exemplary connections within the connection-oriented network 12. Each record assigns a unique connection identifier 42 to a respective connection. Each connection is further defined to commence at a source node 40 and, utilizing different routes 44, to terminate at destination node 16. Each record 38 within the data structure 36 also attributes a maximum bandwidth admission level 46 to the relevant connection.

In one exemplary embodiment of the present invention, the changeover sequence creation module 30, having constructed the changeover sequence data structure 34 as constituting a collection of routing/admission data structures 36, will calculate a bandwidth allocation matrix for each routing/admission data structure 36 that is utilized in the changeover sequence generation process, as will be described in further detail below.

Figure 4:
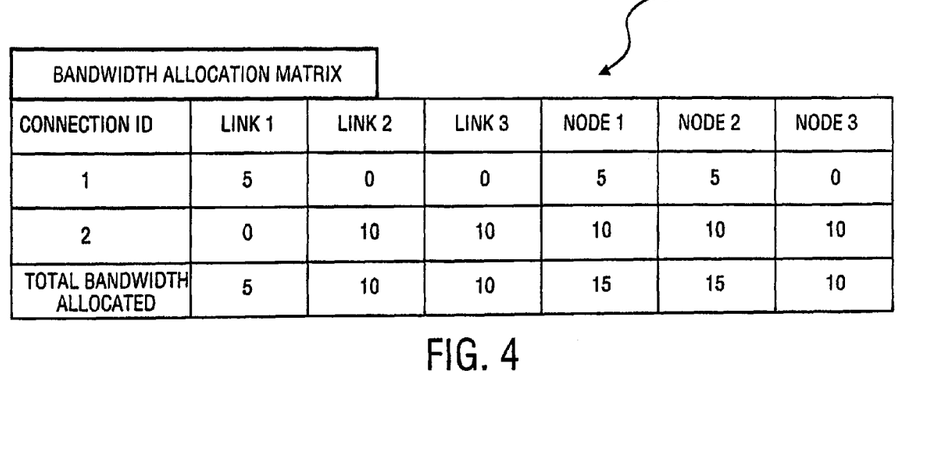
FIG. 4 is a table showing a bandwidth allocation matrix, according to an exemplary embodiment of the present invention, that may be generated based on the routing/admission data structure illustrated in FIG. 3.

FIG. 4 is a table showing a bandwidth allocation matrix 54, according to an exemplary embodiment of the present invention, that may be generated based on the routing/admission data structure 36 illustrated in FIG. 3. The bandwidth allocation matrix 54 is utilized to represent the total bandwidth allocated to each element (e.g., node or link) of a connection-oriented network 12 and/or a particular routing/admission data structure 36. Specifically, the bandwidth allocation matrix 54 sums the bandwidths allocated in each network element used by each connection specified in the routing/admission data structure 36. The bandwidth allocated to any element by a particular connection is a zero if the route 44 utilized by the connection does not pass through the element. If a particular connection does pass through an element, the bandwidth deemed to be allocated to the element is equal to the maximum bandwidth admission level 46 attributed to the relevant connection. Specifically, while bandwidth usage on a connection may drop below the maximum bandwidth admission level 46, usage should not exceed this level. Accordingly, for each network element, the total bandwidth usage should not exceed a sum of maximum bandwidth admission levels 46 applicable to a specific network element.

In certain networks, it may be the case that a source node 40 has not been provided with the functionality or capability to enforce a maximum bandwidth admission level (e.g., the source node 40 cannot cut off bandwidth entering the relevant connection after the bandwidth reaches a certain level). In this case, it is envisaged that the maximum bandwidth admission level 46 within the routing/admission data structure 36 may be replaced by a predicted statistical average for bandwidth demands of the connection, or by an upper bound of the model data flowing through the network 12.

Figure 5:
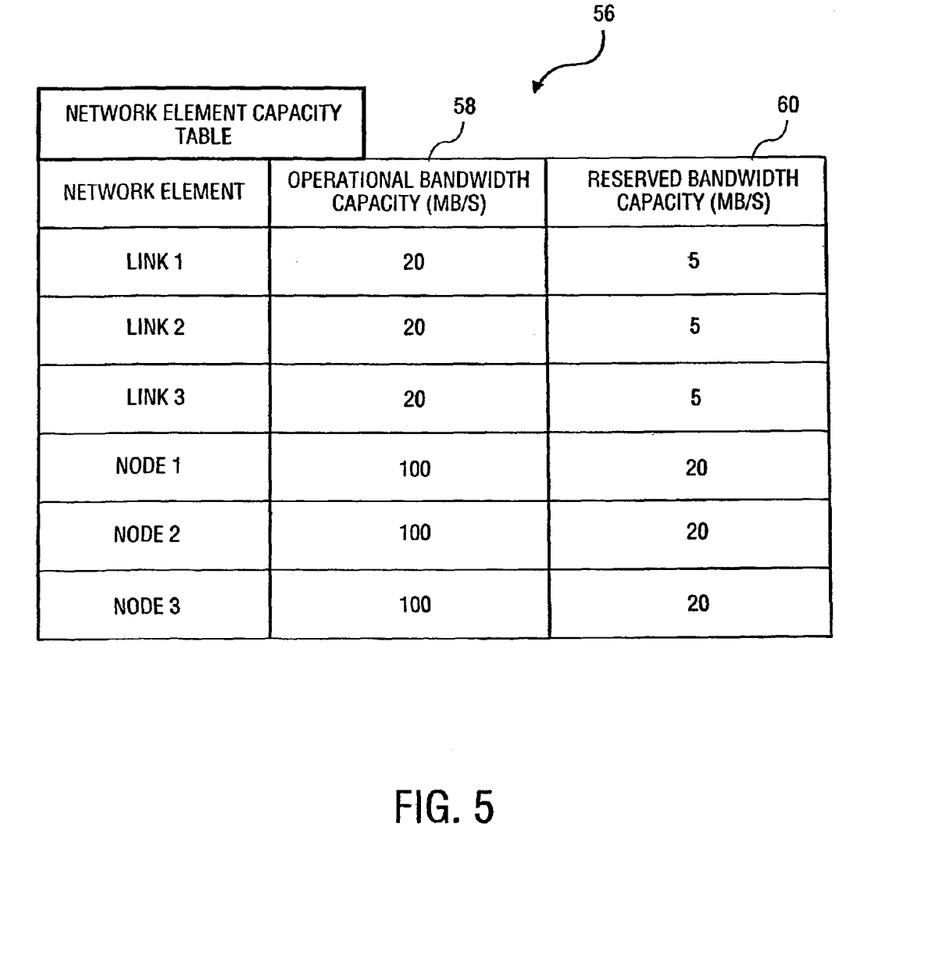
FIG. 5 illustrates a network element capacity table, according to an exemplary embodiment of the present invention, that may also be maintained or accessed by the changeover sequence creation module during generation of the changeover sequence.

FIG. 5 illustrates a network element capacity table 56, according to an exemplary embodiment of the present invention, which may also be maintained or accessed by the changeover sequence creation module 30 during generation of the changeover sequence. The network element capacity table 56 indicates, for each element of the connection-oriented network 12, operational bandwidth capacity 58 and a reserved bandwidth capacity 60. In the exemplary embodiment, the operational bandwidth capacity 58 for each element is the maximum total bandwidth that may be allocated to a network element during an operational configuration (e.g., the existing configuration 26 or the desired configuration 28). The reserved bandwidth capacity 60 for each element is, in one embodiment of the present invention, available for allocation to a network element in any of the intermediate configurations specified by the changeover sequence data structure 34. The availability of this reserved bandwidth capacity 60 is advantageous in that it increases the probability that a valid changeover sequence to migrate the connection-oriented network 12 from the existing to the desired configuration will be found by the changeover sequence creation module 30. It should also be noted that an intermediate configuration specified by the changeover sequence need not utilize any or all reserved bandwidth capacity 60, over and above operational bandwidth capacity 58. For example, in certain implementations, the ability to provide the reserved bandwidth capacity 60 may not be available for a particular reason, in which case the reserved bandwidth capacity 60 is ignored.

Figure 6:
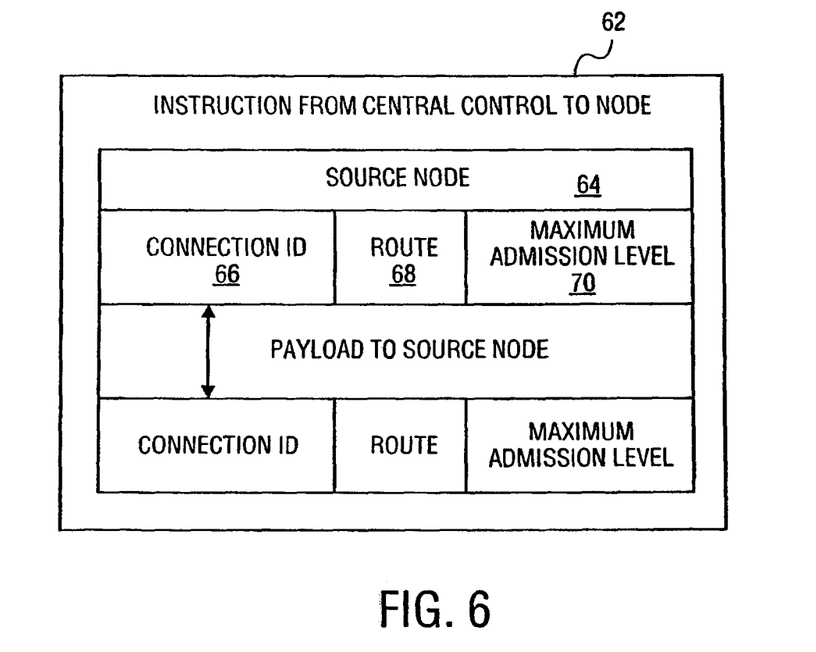
FIG. 6 is a block diagram illustrating an instruction, according to an exemplary embodiment of the present invention, that may be issued from a central controller, in the exemplary form of the changeover signaling module, to a node of the connection-oriented network.

FIG. 6 is a block diagram illustrating an instruction 62, according to an exemplary embodiment of the present invention, that may be issued from a central controller, in the exemplary form of the changeover signaling module 32, to a node of the connection-oriented network 12. The instruction 62 is sent during execution of the changeover sequence to an individual node (e.g., a source node). The instruction 62 includes a source node label 64 and a payload comprised of connection identifiers 66, routes 68 and maximum bandwidth admission levels 70 corresponding to the relevant routes 68. The routes 68 may each include the information indicated in FIG. 2 as being included within the route 44, and comprise the new routes that the identified source node 64 must set up for the connection levels during the changeover period. The admission levels 70 are the new admission levels that the identified source node must establish during the changeover.

In one embodiment, it will be appreciated that the identified source node will utilize the instruction 62 to modify routing tables maintained at the source node.

In certain exemplary networks, it is possible to modify routing by issuing instructions only to the source nodes of respective routings. This is the case for MPLS networks, where a source node alone can re-route a path. In other connection-oriented networks, all nodes (e.g., switches), along an old route and a new route need to be contacted directly. In such cases, an instruction 62 is sent to all nodes on the old route and the new route at each configuration change according to the sequence of configuration specification. Further, in this case, an acknowledgement is required from each of the nodes on both the old and the new routes before proceeding to the next configuration change.

Regarding the modification of routing tables that may be maintained by nodes, in an exemplary embodiment in which the connection-oriented network is a MPLS network, routings may be set up from a source node using the RSVP or LDP protocols. Other connection-oriented networks may use other methods.

Bandwidth admission levels may be changed, in different embodiments, by various "policing" mechanisms that may employ, for example, the DiffServ traffic conditioner to tag bandwidth up to the maximum admission level as higher priority than any bandwidth admitted over that admission level.

Figure 7:
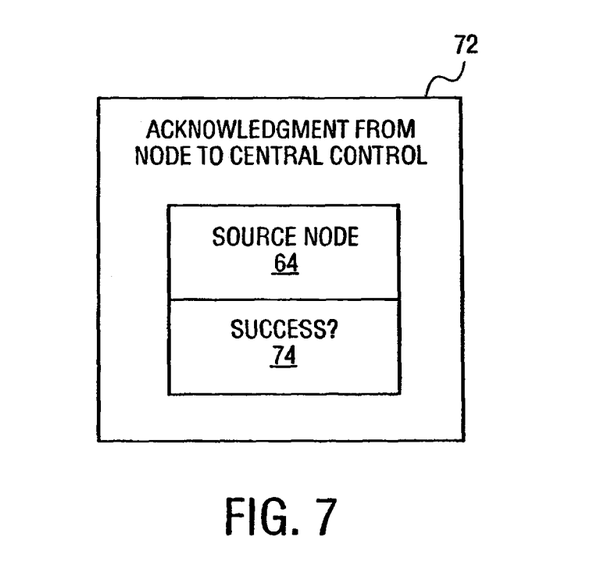
FIG. 7 is a block diagram illustrating an acknowledgement, accordingly to an exemplary embodiment of the present invention, that may be sent from each node responsive to successful execution of a received instruction.

FIG. 7 is a block diagram illustrating an acknowledgement 72, accordingly to an exemplary embodiment of the present invention, which may be sent from each node responsive to successful execution of a received instruction 62. Specifically, the acknowledgement 72 is communicated by each node back to the changeover sequencing module 32 so as to allow the module 32 to determine when all instructions required to implement a specific configuration (e.g., an operational or an intermediate configuration) have been successfully executed. The acknowledgment 72 is shown to include the source node label 64 and also a success field 74 which, if true, indicates that the execution of the changeover instruction 62 was successful.

Methodology—Generation of Changeover Sequence

Figure 8:
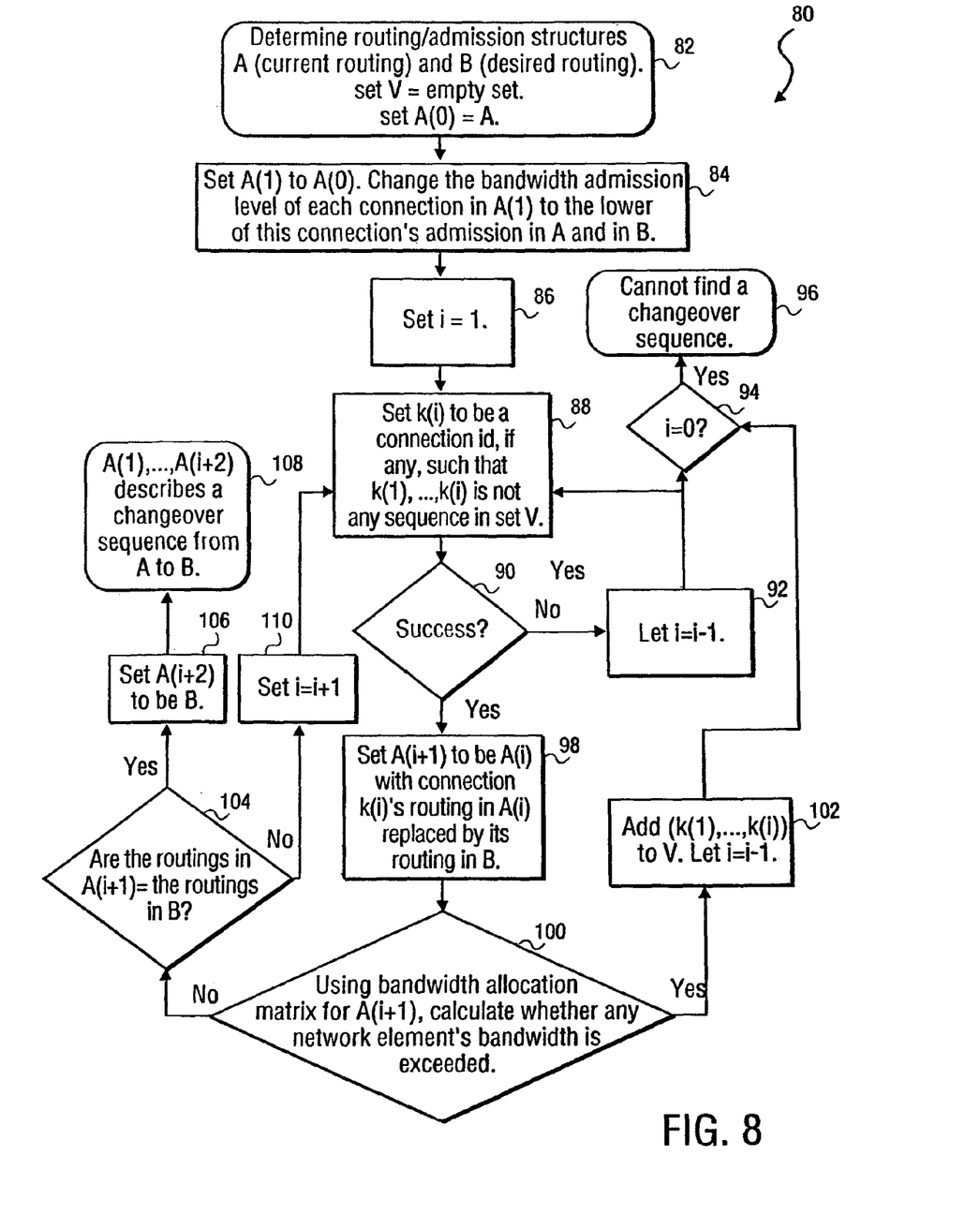
FIG. 8 is a flow chart illustrating a method, according to an exemplary embodiment of the present invention, of generating a changeover sequence to reconfigure a connection-oriented network from an existing configuration to a desired configuration.

FIG. 8 is a flow chart illustrating a method 80, according to an exemplary embodiment of the present invention, of generating a changeover sequence to reconfigure a connection-oriented network 12 from an existing configuration to a desired configuration. In the exemplary embodiment, the changeover sequence creation module 30 performs the method 80, with access to the bandwidth allocation matrix 54 and the element capacity table 56, to generate the changeover sequence data structure 34. Having created the changeover sequence data structure 34 utilizing the method 80, this data structure 34 is communicated to the changeover signaling module 32.

The method 80 commences at block 82 with the determination of the existing configuration 26 and the desired configuration 28. These configuration 26 and 28 may be retrieved from the configuration database 24 by the changeover sequence creation module 30 as routing/admission data structures 36, and are included as "bookends" within the changeover sequence data structure 34. The method 80 operates to create a sequence of configuration specifications $A(0), \ldots, A(n)$, where n has yet to be determined at commencement of the method 80. At block 82, a set V, initially empty, is also created to store a list of "false starts", or attempted configuration specifications that exceeded bandwidth capacities of at least one element of the connection-oriented network 12. If the initial steps of a changeover sequence are found to be unfeasible (e.g., unable to produce a valid sequence), such initial steps are recorded within the set V.

At block 84, an initial intermediate configuration specification in the form of a routing/admission data structure $A(1)$ is calculated. In the exemplary embodiment, the routing/admission data structure $A(1)$ specifies the same routes 44 as the existing routing/admission data structure $A(0)$, but differs in that the maximum bandwidth admission level 46 for each connection is specified by an appropriate record to be reduced to the lower of the bandwidth admission level 46 specified by the existing configuration 26 or by the desired configuration 28.

A main loop of the method 80 is indexed by an index variable i. In each iteration of the loop, a routing/admission data structure $A(i)$ is known, and an attempt is made to construct a subsequent routing/admission data structure $A(i+1)$ for inclusion within a changeover sequence data structure 34. The index variable i may be increased if a successive routing/admission data structure $A(i+1)$ can successfully be created. Alternatively, if such a successive routing/admission data structure $A(i+1)$ cannot be created, a different routing/admission data structure $A(i)$ must be found. At block 86, the index variable i is set a value of 1, and the main loop of the method 80 is entered at block 88.

In one exemplary embodiment to the present invention, each routing/admission data structure $A(1), \ldots, A(n-1)$, differs from a preceding data structure 36 in that exactly one route has been changed (or differs) between the successive data structures 36. In alternative embodiments of the present invention, multiple routes 44 may differ between successive data structures 36 of a changeover sequence data structure 34.

In the exemplary embodiment, in which each routing/admission data structure 36 differs from a preceding only by one route change, the connection identified 42 for the connection to which the routing change has been applied is recorded. Specifically, the connection identifier $k(i)$ for the modified connection is recorded when moving from structure $A(i)$ to structure $A(i+1)$. It will accordingly be appreciated that the sequence $k(1), \ldots, k(i-1)$ completely describes, in one embodiment of the present invention, the construction of the data structures $A(1), \ldots, A(i)$.

At block 88, it will be appreciated that the feasibility of $k(1), \ldots, k(i-1)$ will already have been determined. Accordingly, at block 88, an attempt is made to find a connection $k(i)$ such that $k(1), \ldots, k(i)$ is not already a sequence in the set V.

At decision on block 90, the module 30 determines whether a connection $k(i)$ has successfully been located. If not, at block 92, the index variable i is incremented by a value of 1. At decision block 94, a determination is made at whether the value for the index variable i is 0. If not, the method 80 returns to block 88 in an attempt to locate a further feasible connection for $k(i)$. Alternatively, if the module 30 determines at decision block 94 that the index variable i is equal to 0, and the method 80 terminates at block 96 without having successfully located a changeover sequence.

Returning to decision block 90, if it is determined that a connection $k(i)$ has been successfully located, a next sequential routing/admission data structure $A(i+1)$ is constructed to be identical to the structure $A(i)$, except that the connection with the connection identifier 42 of $k(i)$ has its current routing (i.e., the routing in structure $A(i)$) conformed with that of the routing/admission data structure 36 specifying the desired configuration (e.g., structure B).

At decision block 100, a bandwidth allocation matrix 54, as described above, is constructed for the routing/admission data structure $A(i+1)$. The bandwidth allocation matrix 54 is utilized in conjunction with the network element capacity table 56 by the changeover sequence creation module 30 to determine if the routings specified in the structure $A(i+1)$ cause the capacity of the connection of the network 12 to be exceeded. Specifically, a comparison is made to determine if the total bandwidth allocated by the data structure $A(i+1)$ exceeds the sum of the operational bandwidth capacity 58 and the reserved bandwidth capacity 60 for each network element.

If the bandwidth capacity of at least one network element is determined at decision block 100 to be exceeded by the bandwidth allocated to that element, at block 102 the sequence $k(1), \ldots, k(i)$ is added to the set V to record this set as being the initial part of an infeasible sequence. From block 102, the method 80 then returns to decision block 94.

On the other hand, if the bandwidth allocation of the structure $A(i+1)$ is deemed not to exceed the bandwidth capacity of any of the elements of the connection-oriented network 12 at decision block 100, the method 80 progresses to decision block 104. At decision block 104, a determination is made as to whether the routings specified by the structure $A(i+1)$ match the routings specified by the structure B, which specifies the desired configuration. It should be noted that the determination performed at decision block 104 does not require that the bandwidth admission levels as specified by the structures $A(i+1)$ equal the bandwidth admission levels specified by the structure B.

If the routings are determined at decision block 104 to be equal, at block 106 a final configuration specification in the form of a routing/admission data structure 36 is created by setting data structure $A(i+2)$ equal to data structure B, and by setting n to $i+2$. Accordingly, it will be appreciated that the data structures A(i+1) and A(i+2) may differ only in that the bandwidth admission levels specified by each of these structures may be different.

Moving on from block 106, at block 108 the method 80 then terminates having generated a sequence of data structures A(1), ..., A(i+2) that describes a changeover sequence of configuration specifications to migrate a configuration of the network 12 from an existing configuration to a desired configuration.

Returning to decision block 104, if it is determined that the routings in the data structure A(i+1) do not equal the routings in the data structure B, at block 110, k (i) and A(i+1) are accepted and the index variable i is incremented. Thereafter, the method 80 loops back to block 88 in an attempt to find the next connection to change in the sequence.

Accordingly, in the exemplary embodiment, each routing/admission data structure 36 included within the generated changeover sequence data structure 34, except for the first and last data structures, changes the routing the only a single connection, while leaving the maximum bandwidth admission level 46 for that connection fixed. This has the advantage that, when executing operations to implement the changeover sequence, instructions may, in one embodiment, be sent to a single source node to implement configuration changes specified by successive routing/admission data structures 36 within the changeover sequence data structure 34. Furthermore, each such instruction (or set of instructions) sent to a source node may be applied to a single connection emerging from the relevant source node.

As stated above, in an alternative embodiment, instructions may be sent to all nodes along both the old and new routes to implement a configuration change, as opposed to only sending a single instruction (or set of instructions) to a source node.

Figure 9:
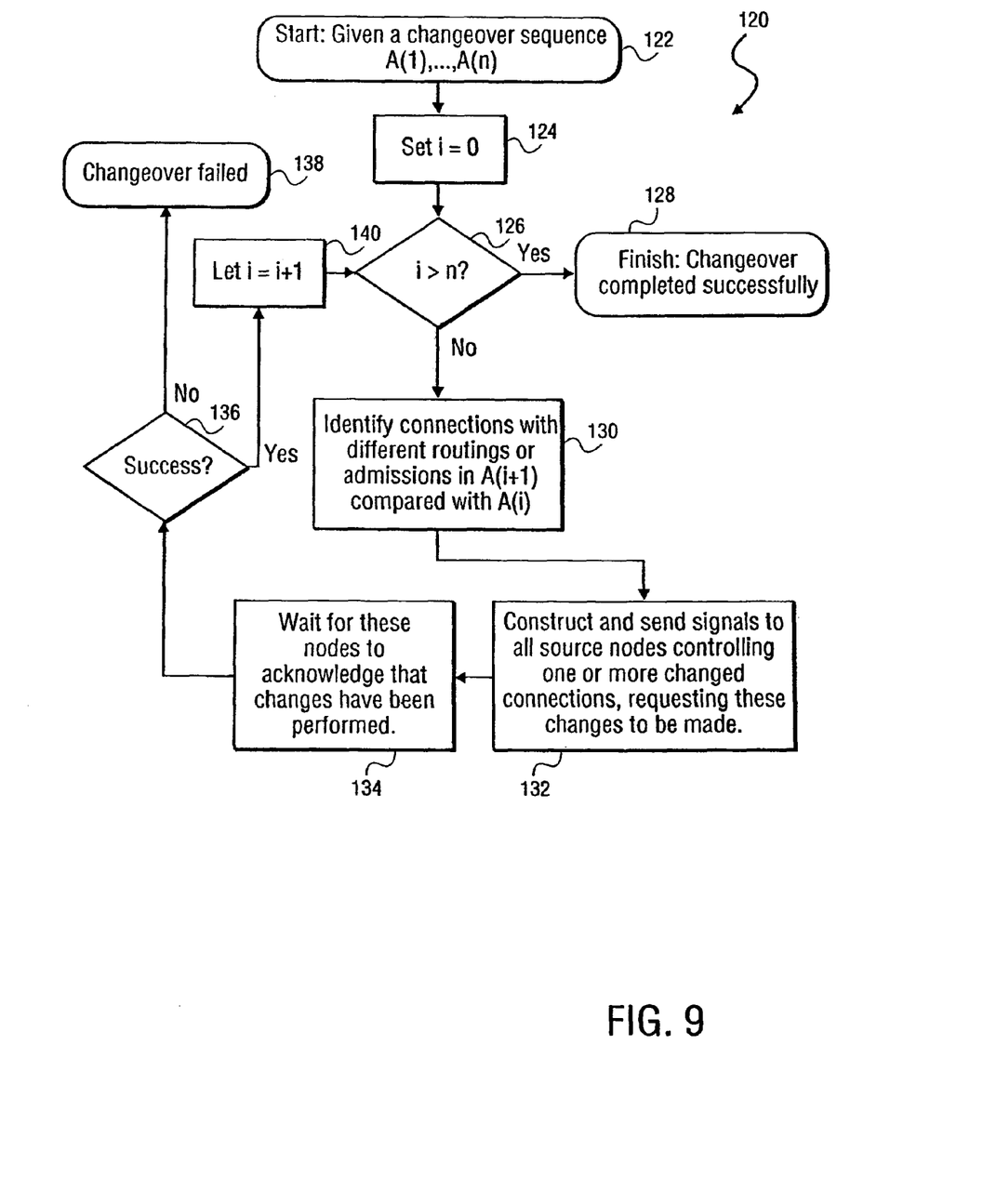
FIG. 9 is a flow chart illustrating a method, according to an exemplary embodiment of the present invention, to reconfigure a connection-oriented network from an existing configuration to a desired configuration, given a changeover sequence.

The configurations of the network 12 according to the first and last routing/admission data structures 36, in the exemplary embodiment, do not change any routings, but only maximum bandwidth admission levels Methodology—Implementation of a Changeover Sequence FIG. 9 is a flow chart illustrating a method 120, according to an exemplary embodiment of the present invention, to reconfigure a connection-oriented network 12 from an existing configuration to a desired configuration, given a changeover sequence. The method 120, in the exemplary embodiment, is executed by a central controller, in the exemplary form of the routing/admission changeover system 10 and the changeover signaling module 32.

The method 120 commences at block 122 with a changeover sequence, comprising a sequence of configuration specifications in the exemplary embodiment of routing/admission data structures 36, being communicated from the changeover sequence creation module 30 to the changeover signaling module 32. Specifically, the changeover sequence may be constituted by data structures A(0), A(1), ..., A(n), where n represents the number of routing/admission data structures 36 within the changeover sequence data structure 34. Data structure A(0) is the routing/admission data structure 36 describes the existing configuration of the connection of the connection-oriented network 12, and A(n) is the routing/admission data structure 36 describing the desired configuration of the connection-oriented network 12. The changeover sequence data structure 34 may, in one embodiment, be generated utilizing the method 80 described above with reference to FIG. 8.

The execution of the changeover sequence is performed through a loop indexed by an index variable i, which is incremented from 0 to n. The index variable i is initialized at block 124, whereafter the method 120 enters a loop at decision block 126. Specifically, at decision block 126, a determination is made as to whether the value for the index variable i is greater than n. Following a positive determination at decision block 126, the method 120 terminates at block 128 as this indicates that all routing/admission data structures 36 within a changeover sequence data structure have been addressed.

Following a negative determination at decision block 126, the method 120 progresses to block 130 where the current routing/admission data structure A(i) is compared to the next (or subsequent) routing/admission data structure A(i+1) to identify connections within the structures that differ. Such differences may be as a result of different routings or different admission levels specified by the structures A(i) and A(i+1).

At block 132, the connections identified at block 130, for which routings or bandwidth admission labels differs, are divided by source node in order to construct an instruction 62, an example of which is discussed above with reference to FIG. 6, to send to each source node with identified connection changes. In the exemplary embodiment of the present invention wherein the changeover sequence is generated according to the method described above with reference to FIG. 8, for intermediate configurations, only one instruction 62 to a single source node 64 is constructed. In an alternative embodiment, sets of instructions may be issued to each node along both a new and an old route to instantiate the configuration change.

As illustrated in FIG. 6, the instruction 62 specifies the recipient source node 64, and new routes 68 and maximum admission levels 70 for connections, which emerge from that source node, to be changed.

At block 132, instructions 62 are sent to each of the relevant source nodes, whereafter execution of the method 120 pauses at block 134 while the changeover signaling module 32 waits for all source nodes signaled at block 132 to acknowledge that they have each successfully executed the respective instruction (or set of instructions) 62 that was send to them. In the alternative embodiment in which all nodes along the old and new routes are signaled, an acknowledge is expected from each such node.

An exemplary acknowledgement 72 that may be issued from each of the source nodes to the changeover signaling module 32 is described above to reference to FIG. 7.

At decision block 136, a determination is made as to whether each of the source nodes that received an instruction 62 have provided an acknowledgement 72 indicating that they have successfully executed the relevant instruction. Specifically, at block 136, if one or more source nodes provide an acknowledgement indicating a failure to execute the relevant instruction 62, or if one or more source nodes do not reply at all within a predetermined time period, a negative determination results at block 136. Thereafter the execution of the changeover sequence is deemed to have failed at block 138.

On the other hand, if all source nodes to which instruction 62 were issued acknowledged successful execution, a positive determination results at decision block 136 and the method 120 progresses to block 140. At block 140, the loop index variable i is incremented and the method 120 loops back to decision block 126. As described above, once all n+1 operations have been successfully completed, a positive determination results at decision block 126, and the changeover is deemed to have successfully completed at block 128.

The implementation of the changeover sequence, if successfully generated and implemented, results in a "seamless" transition from the current to the desired configuration of the connection-oriented network 12 if each transition from one configuration to the next in the changeover sequence is itself "seamless". This will typically be the case if the changeover sequence is devised such that the reconfiguration operations performed at each sequential reconfiguration can be performed in any order by the source nodes, while attempting to guarantee that, at any point during the reconfiguration, sufficient bandwidth was available within the connection-oriented network 12. Sufficient bandwidth may be regarded as enough bandwidth to meet the maximum admission levels for connections, if source nodes enforce such maximum admission levels, or if admission levels are based on statistical predictions of desired bandwidth along the connection. In the exemplary embodiment, the use of a central control, which has global view of the network, to generate coordinate and implement the changeover sequence contributes to a "seamless" transition in that the changeover sequence can be designed and implemented with using the global view to ensure that packets are not lost and network capacities are not exceeded.

While the above method has been described within the context of an exemplary connection-oriented network in which instructions are sent only to source nodes of a route, it will be readily be appreciated that the present invention could also be applied to reconfigure a connection-oriented network where a source node is not enabled to unilaterally modify a routing. In this case, appropriate instructions are sent to each node along the old and new routings. The method, in this exemplary embodiment, then waits for acknowledgements from each of these nodes prior to proceeding to implement a subsequent network configuration, as specified by a sequence of configuration specifications.

Computer System

Figure 10:
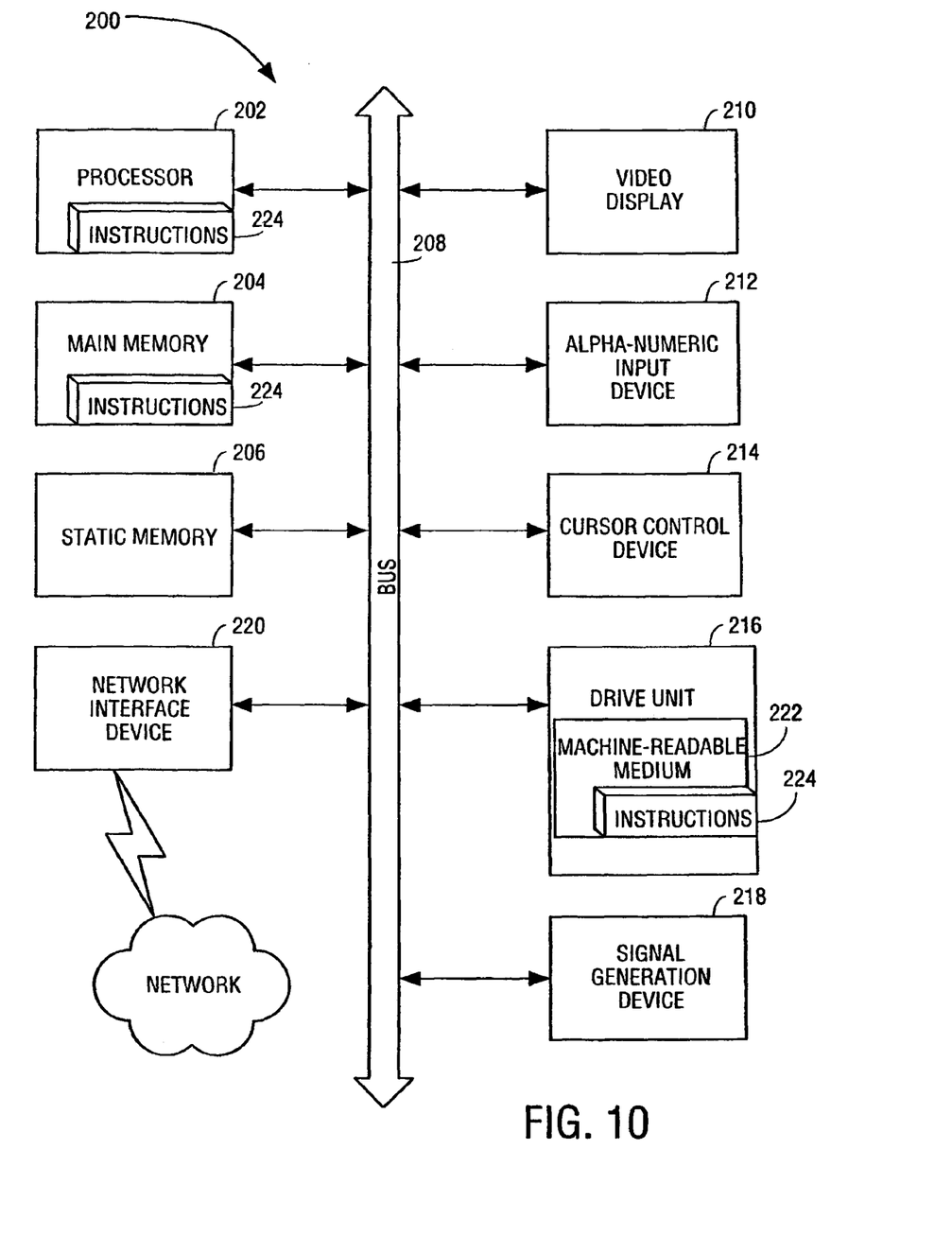
FIG. 10 shows a diagrammatic representation of machine in the exemplary form of a computer system within which a set of instructions, for causing the machine to perform any one of the methodologies discussed herein, may be executed.

FIG. 10 shows a diagrammatic representation of machine in the exemplary form of a computer system 200 within which a set of instructions, for causing the machine to perform any one of the methodologies discussed above, may be executed. In alternative embodiments, the machine may comprise a network router, a network switch, a network bridge, a set-top box (STB), Personal Digital Assistant (PDA), a cellular telephone, a web appliance or any machine capable of executing a sequence of instructions that specify actions to be taken by that machine. Further, while the computer system 200 is shown to comprise single system, it will be appreciate that the machine may comprise a collection of such computer systems 200, and associated storage media, that operate and cooperate to perform any one of the methodologies discussed above.

The computer system 200 includes a processor 202, a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored a set of instructions (i.e., software) 224 embodying any one, or all, of the methodologies, functions or modules described herein.

For example, the creation module 30 and the changeover signaling module 32 may each be implemented as such sets of instructions. The software 224 is also shown to reside, completely or at least partially, within the main memory 204 and/or within the processor 202. The software 224 may further be transmitted or received via the network interface device 220 from a remote storage medium. For the purposes of this specification, the term "machine-readable medium" shall be taken to include any media or medium that is capable of storing, encoding or carrying a sequence of instructions for execution by the machine and that cause the machine to perform any one of the methodologies of the present invention. The term "machine-readable medium" shall accordingly be taken to included, but not be limited to, solid-state memories, optical and magnetic disks, and any to include both a single media and multiple mediums (e.g., distributed, networked mediums).

The exemplary embodiment of the present invention discussed above accordingly allows performing changeovers from a current routing and admission configuration to a desired routing and admission configuration while attempting to ensure that, at no point during the changeover, do any of the connections break, or make excess use of the capacity of the network than is made under the current or desired configurations.

Thus, methods and systems to generate and implement a changeover sequence to reconfigure a connection-oriented network have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to centrally reconfigure a connection-oriented network from an existing configuration to a desired configuration, the method including:

centrally generating a sequence of configuration specifications for the connection-oriented network, the sequence specifying a plurality of intermediate configurations of a plurality of elements of the connection-oriented network, the intermediate configurations being between the existing and the desired configurations, the generation of the sequence of configuration specifications being made prior to commanding any changes to the existing configuration of the network; and centrally implementing the sequence of configuration specifications within the connection-oriented network by, for each configuration specification, centrally issuing at least one instruction to a plurality of elements of the connection-oriented network to modify configuration information maintained at the plurality of elements to thereby instantiate respective configurations, wherein the implementing includes commanding the plurality of elements to execute specific instructions to instantiate a subsequent configuration specification only if acknowledgments are received from each of the plurality of elements that a preceding configuration has been successfully instantiated, wherein multiple instructions are issued to multiple nodes of the connection-oriented network, the multiple nodes being included within an old route and a new route for a connection in sequential configuration specifications of the sequence of configuration specifications.

2. The method of claim 1 wherein the at least one instruction issued to the plurality of elements of the connection-oriented network is to modify routing information maintained at the plurality of elements of the connection-oriented network.

3. The method of claim 1 wherein the at least one instruction issued to the plurality of elements of the connection-oriented network is to modify bandwidth admission information maintained at the plurality of elements of the connection-oriented network.

4. The method of claim 3 wherein the bandwidth admission information specifies a bandwidth admission level for at least a first connection of the connection-oriented network, and wherein the at least one instruction is issued to at least one node of the plurality of elements of the connection-oriented network, the at least one node constituting a source node for the first connection.

5. The method of claim 4 wherein the bandwidth admission level comprises a predetermined bandwidth level allowed to be admitted into the connection-oriented network from the source node.

6. The method of claim 4 wherein the bandwidth admission level comprises a predetermined estimate of bandwidth required by the first connection.

7. The method of claim 1 wherein, for a portion of the sequence of configuration specifications, each configuration specification differs from a preceding configuration specification in that only a route associated with a specific connection differs.

8. A system to centrally reconfigure a connection-oriented network from an existing configuration to a desired configuration, the system including:
   a sequence creation module to centrally generate a sequence of configuration specifications for the connection-oriented network, the sequence specifying a plurality of intermediate configurations of a plurality of elements of the connection-oriented network, the intermediate configurations being between the existing and the desired configurations, the generation of the sequence of configuration specifications being made prior to commanding any changes to the existing configuration of the network; and
   a signaling module, coupled to receive the sequence of configuration specifications from the sequence creation module, and to centrally instantiate the sequence of configuration specifications within the connection-oriented network by, for each configuration specification, issuing at least one instruction to a plurality of elements of the connection-oriented network to modify configuration information maintained at the plurality of elements to thereby instantiate a respective configuration, wherein the signaling module is to command the plurality of elements to execute specific instructions to instantiate a subsequent configuration only if acknowledgments are received from each of the plurality of elements at the signaling module that a preceding configuration has been successfully instantiated, wherein multiple instructions are issued to multiple nodes of the connection-oriented network, the multiple nodes being included within an old route and a new route for a connection in sequential configuration specifications of the sequence of configuration specifications.

9. The system of claim 8 wherein the signaling module is to issue the at least one instruction to the plurality of elements of the connection-oriented network to thereby modify routing information maintained at the plurality of elements of the connection-oriented network.

10. The system of claim 8 wherein the signaling module is to issue the at least one instruction to the plurality of elements of the connection-oriented network to thereby modify bandwidth admission information maintained at the plurality of elements of the connection-oriented network.

11. The system of claim 10 wherein the bandwidth admission information specifies a bandwidth admission level for a first connection of the connection-oriented network, and wherein the signaling module is to issue the at least one instruction to at least one node of the plurality of elements of the connection-oriented network, the at least one node constituting a source node for the first connection.

12. The system of claim 11 wherein the bandwidth admission level comprises a predetermined bandwidth level allowed to be admitted into the connection-oriented network from the source node.

13. The system of claim 11 wherein the bandwidth admission level comprises a predetermined estimate of bandwidth required by the first connection.

14. The system of claim 8 wherein, for a portion of the sequence of configuration specifications, each configuration specification differs from a preceding configuration specification in that only a route associated with a specific connection differs.

15. A system to centrally reconfigure a connection-oriented network from an existing configuration to a desired configuration, the system including:
   first means for centrally generating a sequence of configuration specifications for the connection-oriented network, the sequence specifying a plurality of intermediate configurations of a plurality of elements of the connection-oriented network, the intermediate configurations being between the existing and the desired configurations, the generation of the sequence of configuration specifications being made prior to commanding any changes to the existing configuration of the network;
   second means, coupled to receive the sequence of configuration specifications from the first means, for centrally instantiating the sequence of configuration specifications within the connection-oriented network by, for each configuration specification, issuing at least one instruction to a plurality of elements of the connection-oriented network to modify configuration information maintained at the plurality of elements to thereby instantiate a respective configuration, wherein the second means is for commanding the plurality of elements to execute specific instructions to instantiate a subsequent configuration only if acknowledgments are received from each of the plurality of elements at the signaling module that a preceding configuration has been successfully instantiated, wherein multiple instructions are issued to multiple nodes of the connection-oriented network, the multiple nodes being included within an old route and a new route for a connection in sequential configuration specifications of the sequence of configuration specifications.

16. A non-transitory machine-readable medium for storing a sequence of instructions that, when executed by a machine, cause the machine to:
   centrally generate a sequence of configuration specifications for a connection-oriented network, the sequence specifying a plurality of intermediate configurations of a plurality of elements of the connection-oriented network, the intermediate configurations being between the existing and the desired configurations, the generation of the sequence of configuration specifications being made prior to commanding any changes to the existing configuration of the network; and
   centrally implement the sequence of configuration specifications within the connection-oriented network by, for each configuration specification, centrally issuing at least one instruction to a plurality of elements of the connection-oriented network to modify configuration information maintained at the plurality of elements to thereby instantiate respective configurations, and command the plurality of elements to execute specific instructions to instantiate a subsequent configuration specification only if acknowledgments are received from each of the plurality of elements that a preceding configuration has been successfully instantiated, wherein multiple instructions are issued to multiple nodes of the connection-oriented network, the multiple nodes being included within an old route and a new route for a connection in sequential configuration specifications of the sequence of configuration specifications.

* * * * *

UNITED STATES PATENT AND TRADEMARK OFFICE
CERTIFICATE OF CORRECTION

PATENT NO.         : 7,958,209 B2
APPLICATION NO.    : 11/927956
DATED              : June 7, 2011
INVENTOR(S)        : Alan T. Gous et al.

It is certified that error appears in the above-identified patent and that said Letters Patent is hereby corrected as shown below:

On the title page, in field (75), in "Inventors", in column 1, line 3, delete "Melno" and insert -- Menlo --, therefor.

On the title page, in field (74), in "Attorney, Agent, or Firm", in column 2, line 2, delete "woessner," and insert -- Woessner, --, therefor.

In column 5, lines 60-62, delete "A second 6 may include node 14, link 22, node 18, link 24 and node 16." and insert -- A second connection between node 14 and 16 may include node 14, link 22, node 18, link 24 and node 16. --, therefor.

In column 10, line 61, delete "A (i+1)" and insert -- A(i+1) --, therefor.

In column 11, line 12, delete "k (i)" and insert -- k(i) -- therefor.

In column 11, line 38, after "levels" insert -- . --.

In column 11, line 58, after "configuration" delete "of the connection".

Signed and Sealed this
Third Day of July, 2012

David J. Kappos
*Director of the United States Patent and Trademark Office*